United States Patent
Butcher et al.

(10) Patent No.: US 9,638,113 B2
(45) Date of Patent: May 2, 2017

(54) CONTROL STRATEGY FOR A HYBRID VEHICLE WITH A DISABLED MOTOR

(71) Applicant: FORD GLOBAL TECHNOLOGIES, LLC, Dearborn, MI (US)

(72) Inventors: Jonathan Andrew Butcher, Farmington, MI (US); Ming Lang Kuang, Canton, MI (US); Paul Stephen Bryan, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 587 days.

(21) Appl. No.: 14/014,583

(22) Filed: Aug. 30, 2013

(65) Prior Publication Data
US 2015/0066333 A1   Mar. 5, 2015

(51) Int. Cl.
| | | |
|---|---|---|
| B60W 10/06 | (2006.01) | |
| F02D 29/02 | (2006.01) | |
| B60W 50/02 | (2012.01) | |
| B60W 20/50 | (2016.01) | |
| B60W 20/10 | (2016.01) | |
| F02D 29/06 | (2006.01) | |

(52) U.S. Cl.
CPC ............. *F02D 29/02* (2013.01); *B60W 10/06* (2013.01); *B60W 20/50* (2013.01); *B60W 50/0225* (2013.01); *B60W 20/10* (2013.01); *F02D 29/06* (2013.01)

(58) Field of Classification Search
CPC ........ F02D 29/02; F02D 29/06; F02D 41/227; B60W 10/06; B60W 20/10; B60W 20/106; B60W 20/20; B60W 20/50

USPC ...... 180/65.21, 65.4, 65.27, 65.28; 290/40 C
See application file for complete search history.

(56) References Cited

U.S. PATENT DOCUMENTS

| | | | |
|---|---|---|---|
| 7,275,610 B2 | 10/2007 | Kuang et al. | |
| 7,285,869 B2 | 10/2007 | Syed et al. | |
| 7,292,932 B1* | 11/2007 | Ledger | B60K 6/445 123/350 |
| 7,576,501 B2 | 8/2009 | Okubo et al. | |
| 7,946,951 B2* | 5/2011 | Kimura | B60K 6/365 180/65.28 |
| 8,315,755 B2* | 11/2012 | Hirata | B60K 6/365 180/65.28 |
| 8,731,751 B2* | 5/2014 | Simon, Jr. | B60K 6/48 477/3 |
| 2005/0184529 A1* | 8/2005 | Ueda | B60K 6/445 290/40 C |
| 2009/0150015 A1* | 6/2009 | Okubo | B60W 30/188 701/22 |
| 2010/0323844 A1* | 12/2010 | Okubo | B60K 6/445 477/3 |

(Continued)

*Primary Examiner* — Thomas Moulis
*Assistant Examiner* — George Jin
(74) *Attorney, Agent, or Firm* — David B. Kelley; Brooks Kushman P.C.

(57) ABSTRACT

A method for controlling an engine in a hybrid electric vehicle according to the present disclosure includes, in response to a drive motor being unavailable, commanding an engine power equal to the lesser of a first and a second power. The first power is sufficient to satisfy a driver wheel torque request at the current engine speed, and the second power corresponds to a maximum engine torque available at a target engine speed, where the target engine speed is selected to attain a desired battery state of charge.

17 Claims, 3 Drawing Sheets

(56) References Cited

U.S. PATENT DOCUMENTS

2014/0155222 A1* 6/2014 Kim .................... B60W 20/106
477/5

* cited by examiner

CONTROL STRATEGY FOR A HYBRID VEHICLE WITH A DISABLED MOTOR

TECHNICAL FIELD

The present disclosure relates to a control strategy for a hybrid electric vehicle with a disabled drive motor.

BACKGROUND

Hybrid electric vehicles typically include a powertrain having two power sources, which may establish first and second power flow paths to vehicle traction wheels. The first power source is an internal combustion engine with a planetary gear set for distributing power through separate power flow paths to a generator system and to vehicle traction wheels. The second power source is an electric drive system including first and second electric machines serving primarily as a generator and an electric drive motor, respectively. The second power source also includes a battery. The battery acts as an energy storage medium for the generator and the motor.

When the powertrain is operating with the first power source, the engine power is divided between the two flow paths by controlling generator speed. In this fashion, engine speed may be decoupled from wheel speed, such that vehicle speed changes do not depend upon engine speed changes. When the powertrain is operating with the second power source, the electric motor drives the torque output shaft to the vehicle traction wheels through gearing.

Of the two electric machines, the drive motor is most critical for controlling total wheel torque and electric power consumption. As a result, if the drive motor is unavailable, the powertrain capabilities may be severely limited. In such circumstances, known hybrid vehicles will either disable a drive mode or will enter a limited operating strategy ("creep") mode. Either method is detrimental to customer satisfaction. Consequently, it is desirable to develop a method enabling a hybrid vehicle with an unavailable drive motor to be driven at speeds greater than those allowed in creep mode.

SUMMARY

A method for controlling an engine in a hybrid electric vehicle includes, in response to a drive motor being unavailable, commanding an engine power equal to the lesser of a first and a second power. The first power is sufficient to satisfy a driver wheel torque request at the current engine speed, and the second power corresponds to a maximum engine torque available at a target engine speed, where the target engine speed is selected to attain a desired battery state of charge.

In an embodiment of a method, the first power is the product of an engine torque request and the current engine speed, where the engine torque request is the product of the driver wheel torque request and a gear ratio. In another embodiment, the target engine speed for attaining a desired battery state of charge is the sum of a calculated charge neutral engine speed and a predetermined scalar offset for charging or discharging. In yet another embodiment, the second power is equal to the product of a current traction wheel speed and a maximum wheel torque corresponding to the maximum engine torque, incremented by power quantity of battery usage to charge or discharge the battery. In some such embodiments, the power quantity of battery usage is obtained from a lookup table. In other such embodiments, the power quantity of battery usage is clipped to be less than a battery charging limit.

A hybrid electric vehicle includes an engine, a battery, a drive motor, and a controller. The controller is configured to, in response to the drive motor being unavailable, control the engine to produce an engine power equal to the lesser of a first power and a second power. The first power is sufficient to satisfy a driver wheel torque request at the current engine speed, and the second power corresponds to a maximum engine torque available at a target engine speed, where the target engine speed is selected to attain a desired battery state of charge.

In an embodiment of a vehicle, the first power is the product of an engine torque request and the current engine speed, where the engine torque request is the product of the driver wheel torque request and a gear ratio. In another embodiment, the target engine speed for attaining a desired battery state of charge is the sum of a calculated charge neutral engine speed and a predetermined scalar offset for charging or discharging. In yet another embodiment, the second power is equal to the product of a current traction wheel speed and a maximum wheel torque corresponding to the maximum engine torque, incremented by power quantity of battery usage to charge or discharge the battery. In some such embodiments, the controller is further configured to obtain the power quantity of battery usage from a lookup table. In other such embodiments, controller is further configured to clip the power quantity of battery usage to be less than a battery charging limit.

A method for controlling a powertrain of a hybrid electric vehicle, where the vehicle includes an electric drive motor, a battery, an engine, and vehicle traction wheels, includes varying an engine power in response to the drive motor being unavailable and traction wheel speed being above a threshold. The engine power is varied to maintain a battery state of charge within a desired range.

In an embodiment of the method, varying the engine power includes calculating a charge neutral engine speed, adding a scalar offset for battery charging or discharging to obtain a target engine speed, and commanding an engine to generate a power corresponding to the maximum engine torque at the target engine speed. In one such embodiment, the power corresponding to the maximum engine torque at the target engine speed is equal to the product of the current traction wheel speed and a maximum wheel torque, where the maximum wheel torque corresponds to the maximum engine torque, further incremented by a power quantity to charge or discharge the battery. The power quantity may be obtained from a lookup table. The power quantity may also be clipped to be less than a battery charging limit. In another embodiment, the method further comprises, in response to the drive motor being unavailable and traction wheel speed being below the threshold, commanding the engine to generate an engine power equal to the product of the current engine speed and an engine torque to satisfy a driver torque request.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
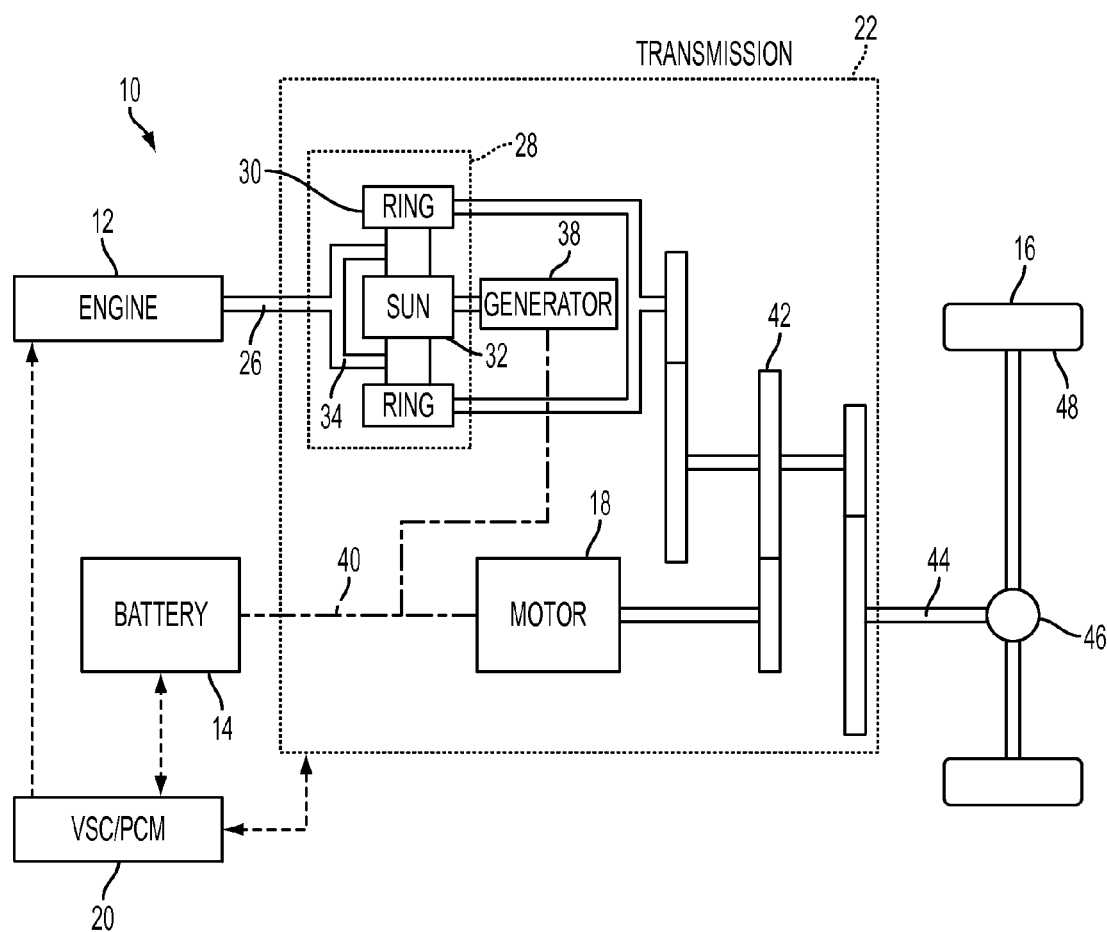
FIG. 1 is a schematic representation of a hybrid vehicle powertrain.

Referring to FIG. 1, a hybrid electric vehicle (HEV) includes a power-split powertrain 10 in which either or both of an internal combustion engine 12 and a high voltage battery, or electric traction battery 14, provide tractive power to wheels 16 of the vehicle. The battery 14 has a two-way electrical connection, whereby it receives and stores electric energy (e.g., via regenerative braking) and also supplies the energy to an electric traction motor/generator 18, or "electric machine". A vehicle system controller (VSC) and/or powertrain control module (PCM) 20 controls operation of the engine 12, the battery 14 and the electric machine 18. Both the engine 12 and the electric machine 18 are capable of powering a transmission 22 that ultimately delivers torque to the wheels 16 of the vehicle.

The battery 14 can include its own designated battery control module (BCM) electrically connected thereto for controlling the operation of the battery 14. Alternatively, the VSC/PCM 20 can directly control the operation of the battery 14. Other power control modules can exist. It should be understood that throughout this disclosure, the VSC/PCM 20, the BCM and other control modules that control the power flow throughout the powertrain 10 can be collectively referred to as "controllers".

In the power split powertrain 10, the engine 12 delivers power to a torque input shaft 26 that is connected to a planetary gear set 28 through a one way clutch (not shown). The planetary gear set 28 that includes a ring gear 30, a sun gear 32, and a planetary carrier assembly 34. The input shaft 26 is driveably connected to the carrier assembly 34 to power the planetary gear set 28. The sun gear 32 is driveably connected to a generator 38. The generator 38 may be selectively engaged with the sun gear 32 via a clutch (not shown), such that the generator 38 may either rotate with the sun gear 32, or not rotate with it. When the one way clutch (not shown) couples the engine 12 to the planetary gear set 28, the generator 38 generates energy as a reactionary element to the operation of the planetary gear set 28. Electric energy generated from the generator 38 is transferred to the battery 14 through electrical connections 40 and a high voltage bus. The battery 14 also receives and stores electric energy through regenerative braking, in known fashion. The battery 14 supplies the stored electric energy to the electric machine 18 for operation. The portion of the power delivered from the engine 12 to the generator 38 may also be transmitted directly to the electric machine 18. The battery 14, electric machine 18, and generator 38 are each interconnected in a two-way electric flow path through electrical connections 40.

The vehicle may be powered by the engine 12 alone, by the battery 14 and electric machine 18 alone, or by a combination of the engine 12 with the battery 14 and electric machine 18. In a first mode of operation ("hybrid mode of operation," "hybrid propulsion mode," etc.) the engine 12 is activated to deliver torque through the planetary gear set 28. The ring gear 30 distributes torque to step ratio gears 42 comprising multiple meshing gear elements. Torque is distributed from the ring gear 30, through the gears 42 and to a torque output shaft 44. In the first mode of operation, the electric machine 18 may also be activated to assist the engine 12 in propelling the vehicle by transferring torque through the gears 42 to the torque output shaft 44.

In a second mode of operation ("electric-only propulsion mode," "EV mode," etc.), the engine 12 is disabled or otherwise prevented from distributing torque to the output shaft 44. In the second mode of operation, the battery 14 powers the electric machine 18 to distribute torque through the step ratio gears 42 and to the torque output shaft 44.

In either or both of the first mode of operation and the second mode of operation, the VSC/PCM 20 controls the engine 12, battery 14, electric machine 18 and generator 38 in order to distribute torque to the torque output shaft 44. The torque output shaft 44 is connected to a differential and axle mechanism 46 which distributes torque to power the wheels 16. Brakes 48 are also provided, and may be controlled by the VSC/PCM 20 or by another controller.

It should be understood that either or both of the electric machine 18 and generator 38 can each generate electric power or provide propulsion power in methods described above. Both of the electric machine and the generator 38 can interchangeably be referred to as either a motor or a generator, or broadly as an electric machine.

Of the two electric machines, electric machine 18 is most critical for controlling total wheel torque and electric power consumption as it has a direct mechanical connection to wheels 16. As a result, if electric machine 18 is unavailable, the powertrain 10 capabilities may be limited. If the combustion engine 12 and electric generator 38 are still available, then vehicle operation is possible. However, the loss of electric machine 18 leads to additional challenges, including preventing overcharging battery 14.

Figure 2A:
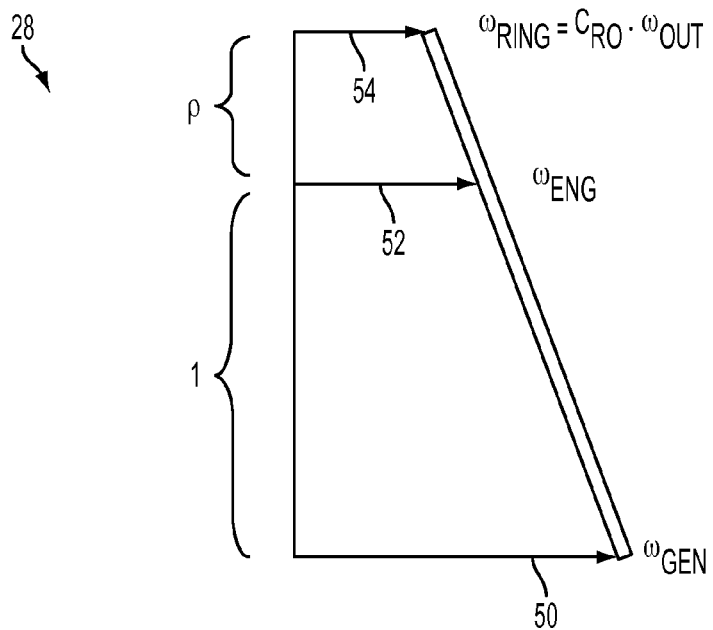
FIGS. 2a-2c are lever diagrams illustrating speed relationships among gearing elements of a planetary gear set.
Figures 2B, 2C:
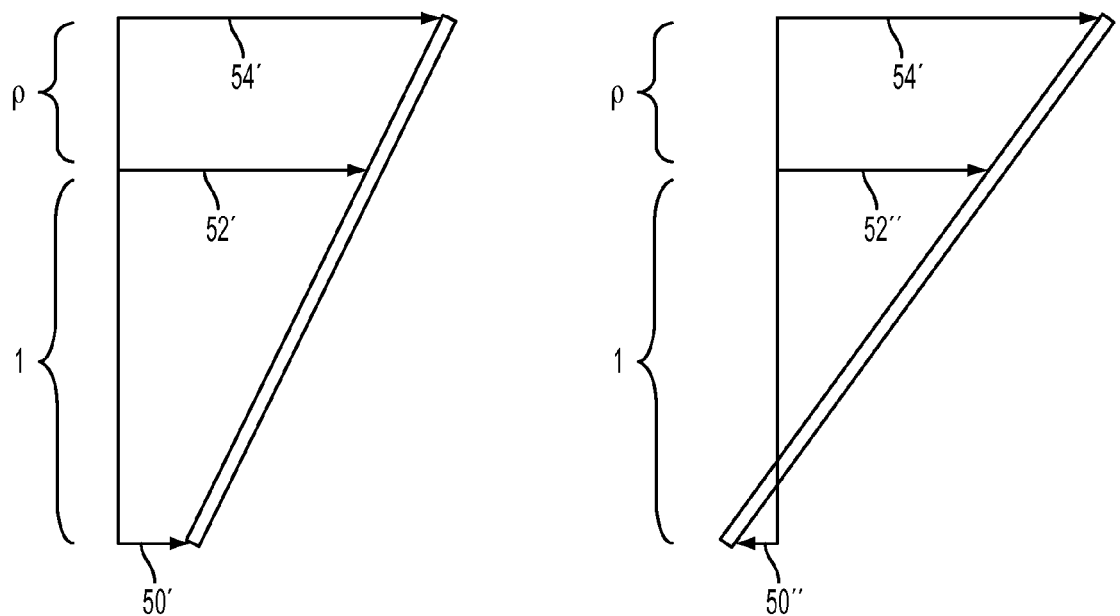

Referring now to FIGS. 2a-2c, lever representations of the speeds of the sun, planet carrier, and ring gears of planetary gear set 28 is shown. Planetary gear set 28 imposes a fixed linear relationship among ring gear speed 54, planet carrier speed 52, and sun gear speed 50. The linear speed relationship is indicated by planetary gear ratio ρ, defined as the number of sun gear teeth divided by the number of ring gear teeth. The sun gear connects to electric generator 38, and so sun gear speed 50 can be understood to be equal to a generator speed $\omega_{gen}$. The planet carrier connects to combustion engine 12, and so planet carrier speed 52 can be understood to be equal to an engine speed $\omega_{eng}$. The ring gear connects to the output shaft through a gearing assembly, and so ring gear speed 54 can be understood to be equal to $\omega_{ring}$, where $\omega_{ring} = C_{RO} \times \omega_{out}$, $C_{RO}$ being the gear ratio of the gear assembly and $\omega_{out}$ being the output shaft speed.

As shown in FIG. 2a, at a low vehicle wheel speed (low $\omega_{out}$), ring gear speed 54 is low. Engine speed $\omega_{eng}$ has a minimum idle threshold below which the engine may not operate, and thus carrier speed 52 has a minimum positive value when combustion engine 12 is turned on. Thus, according to planetary gear ratio ρ and gear ratio $C_{RO}$, at a low vehicle speeds sun gear speed 50 must be positive. Consequently, at low vehicle speeds $\omega_{gen}$ will be positive, resulting in battery charging.

As shown in FIGS. 2*b* and 2*c*, at higher vehicle wheel speeds the engine speed may be controlled to charge or discharge the battery as desired. As wheel speed increases, ring gear speed 54' increases to a speed that exceeds the idle engine speed. Once wheel speed 54' exceeds a threshold, the engine speed may be increased if charging is desired or decreased if discharging is desired. When the engine speed is increased in FIG. 2*b*, planet carrier speed 52' increases, and according to planet gear ratio ρ, sun gear speed 50' increases to a positive value such that $\omega_{gen}$ is positive, resulting in battery charging. When the engine speed is decreased in FIG. 2*c*, planet carrier speed 52" decreases, and according to planet gear ratio ρ, sun gear speed 50" decreases to a negative value such that $\omega_{gen}$ is negative, reversing the direction of rotation and resulting in battery discharging.

A control strategy when a motor is unavailable should satisfy conflicting requirements at low vehicle speeds. The strategy should limit battery charging magnitude and duration while also providing a maximum amount of wheel torque.

Figure 3:
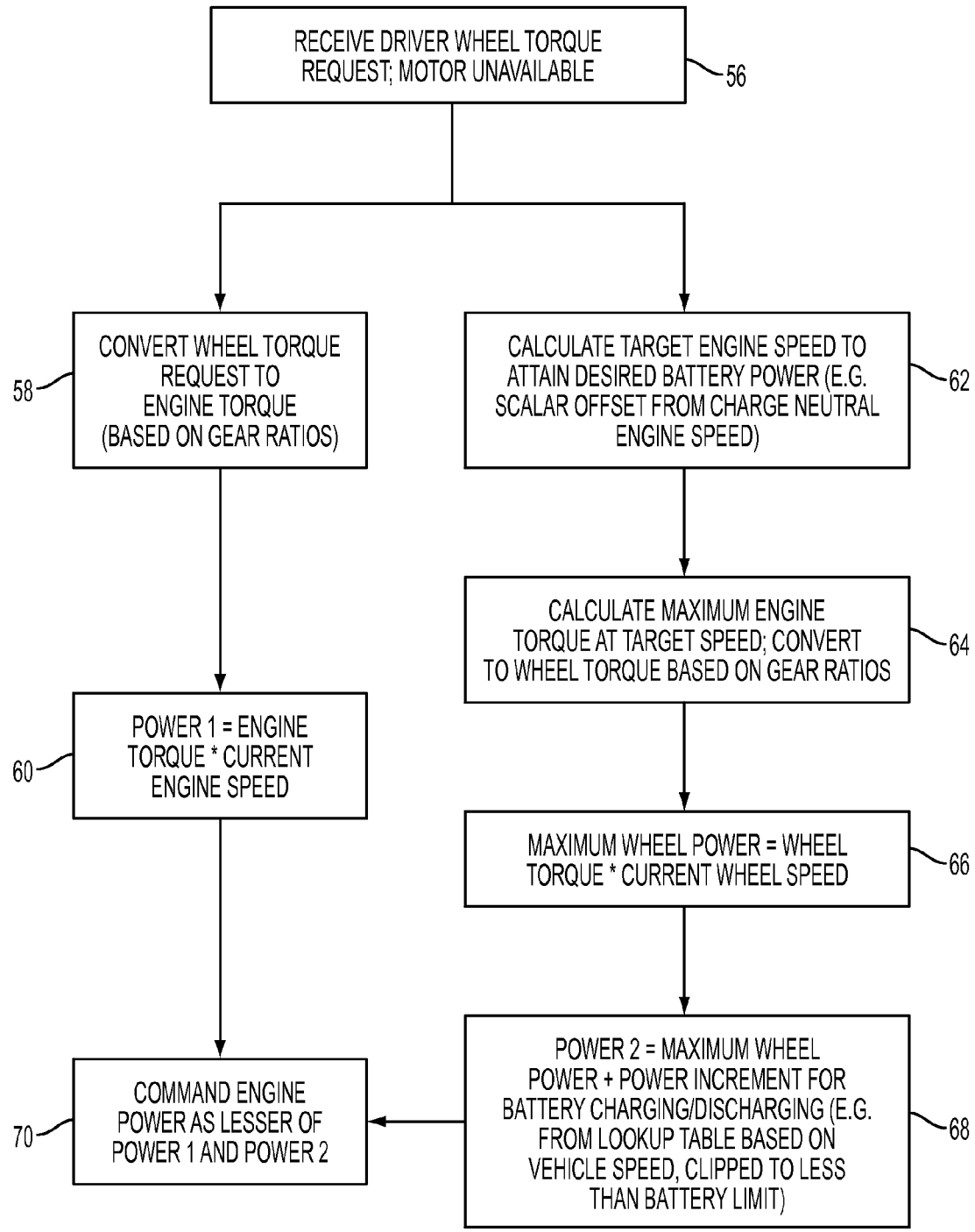
FIG. 3 is a flowchart illustrating a method of controlling a powertrain in a hybrid electric vehicle.

Referring now to FIG. 3, a strategy for controlling a hybrid electric vehicle is shown in flowchart form. A driver torque request is received when the drive motor is unavailable, as illustrated by block 56. Two potential engine powers are then calculated.

The first engine power is calculated by first determining the amount of engine torque required to satisfy the driver wheel torque request, as illustrated by block 58. This is performed by using gear ratios to convert the driver wheel torque request to an engine torque. The gear ratios may include planetary gear ratio ρ and gear ratio $C_{RO}$. The first potential engine power is equal to the calculated engine torque multiplied by the current engine speed, as illustrated in block 60.

The second engine power option is determined by first calculating a target engine speed based on a current battery state of charge, as illustrated in block 62. If the battery state of charge is low, then the target engine speed will be higher to charge the battery, and if the battery state of charge is high, then the target engine speed will be lower to prevent overcharging. In one embodiment, an algorithm may calculate a "charge-neutral" engine speed, at which the battery charging is exactly offset by electrical losses. In this embodiment, the charging and discharging engine speeds may be scalar offsets from the charge-neutral engine speed. Other methods of determining a target engine speed may also be used, such as a look-up table containing target engine speeds based on battery states of charge. A maximum engine torque at the target speed is then calculated and converted to a wheel torque using planetary gear ratios, as illustrated in block 64. A maximum wheel power is then calculated, equal to the multiple of the maximum wheel torque and the current wheel speed, as illustrated in block 66. The second power option is equal to the maximum wheel power, plus an allowable amount of battery usage, as illustrated in block 68. The power quantity of battery usage may be obtained from a lookup table as a function of vehicle speed, for example. The battery power quantity may be clipped to be smaller than the sum of the actual battery power limit and electrical losses. This prevents an unintended overcharging of the battery.

After calculating the first engine power option and the second power option, the engine is commanded to generate the lesser of the two power options, as illustrated in block 70. This command may be issued by the VSC or other control as appropriate.

Using the above method, a maximum amount of torque is applied to the wheels without overcharging the vehicle battery. Consequently, a hybrid vehicle with an unavailable drive motor may be driven at speeds higher than possible in creep mode.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for controlling an engine in a hybrid electric vehicle comprising:
in response to a drive motor being unavailable, commanding an engine power equal to the lesser of a first power to satisfy a driver wheel torque request at a current engine speed, and a second power corresponding to a maximum engine torque available at a target engine speed determined to attain a desired battery state of charge.

2. The method of claim 1, wherein the first power is a product of an engine torque request and the current engine speed and wherein the engine torque request is equal to the product of the driver wheel torque request and a gear ratio.

3. The method of claim 1, wherein the target engine speed for attaining a desired battery state of charge is the sum of a calculated charge neutral engine speed and a predetermined scalar offset.

4. The method of claim 1, wherein the second power is equal to the product of a current traction wheel speed and a maximum wheel torque corresponding to the maximum engine torque, incremented by a power quantity to charge or discharge a battery.

5. The method of claim 4, wherein the power quantity is obtained from a lookup table.

6. The method of claim 4, wherein the power quantity to charge or discharge the battery is clipped to be less than a battery charging limit.

7. A hybrid electric vehicle comprising:
an engine;
a battery;
a motor; and
a controller configured to, in response to the motor being unavailable, control the engine to produce an engine power equal to the lesser of a first power to satisfy a driver wheel torque request at a current engine speed, and a second power corresponding to a maximum engine torque available at a target engine speed for attaining a desired battery state of charge.

8. The hybrid vehicle of claim 7, wherein the first power is a product of an engine torque request and the current engine speed and wherein the engine torque request is equal to the product of the driver wheel torque request and a gear ratio.

9. The hybrid vehicle of claim 7, wherein the target engine speed for attaining a desired battery state of charge is the sum of a calculated charge neutral engine speed and a predetermined scalar offset.

10. The hybrid vehicle of claim 7, wherein the second power is equal to the product of a current traction wheel speed and a maximum wheel torque corresponding to the maximum engine torque, incremented by a power quantity to charge or discharge the battery.

11. The hybrid vehicle of claim 10, wherein the at least one controller is further configured to obtain the power quantity from a lookup table.

12. The hybrid vehicle of claim 10, wherein the at least one controller is further configured to clip the power quantity to be less than a battery charging limit.

13. A method for controlling a powertrain of a hybrid electric vehicle, the vehicle having an electric drive motor, a battery, an engine, and vehicle traction wheels, the method comprising:

in response to the drive motor being unavailable and a traction wheel speed being above a threshold, varying an engine power to maintain a battery state of charge within a desired range; and in response to the drive motor being unavailable and a traction wheel speed being below the threshold, commanding the engine to generate an engine power equal to the product of the current engine speed and an engine torque to satisfy a driver torque request.

14. The method of claim 13, wherein varying an engine power to maintain a battery state of charge within a desired range includes calculating a charge neutral engine speed, adding a predetermined scalar offset for battery charging or discharging to obtain a target engine speed, and commanding the engine to generate a power corresponding to a maximum engine torque at the target engine speed.

15. The method of claim 14, wherein the power corresponding to the maximum engine torque at the target engine speed is equal to the product of a current traction wheel speed and a maximum wheel torque corresponding to the maximum engine torque, incremented by a power quantity to charge or discharge the battery.

16. The method of claim 15, wherein the power quantity is obtained from a lookup table.

17. The method of claim 15, wherein the power quantity is clipped to be less than a battery charging limit.

* * * * *